United States Patent [19]

Kingman

[11] Patent Number: 5,303,203
[45] Date of Patent: * Apr. 12, 1994

[54] METHOD FOR REDUCING NOISE EFFECTS IN ACOUSTIC SIGNALS TRANSMITTED ALONG A PIPE STRUCTURE

[75] Inventor: John E. E. Kingman, Dallas, Tex.

[73] Assignee: Atlantic Richfield Company, Los Angeles, Calif.

[ * ] Notice: The portion of the term of this patent subsequent to Jul. 14, 2009 has been disclaimed.

[21] Appl. No.: 911,413

[22] Filed: Jul. 10, 1992

Related U.S. Application Data

[63] Continuation of Ser. No. 746,172, Aug. 14, 1991, Pat. No. 5,130,951, which is a continuation of Ser. No. 564,621, Aug. 8, 1990, abandoned.

[51] Int. Cl.$^5$ ............... G01V 1/14; G01V 1/40
[52] U.S. Cl. .................. 367/75; 367/31; 367/82; 364/421
[58] Field of Search ............ 367/82, 31, 75; 364/421

[56] References Cited

U.S. PATENT DOCUMENTS

| | | | |
|---|---|---|---|
| 2,927,300 | 3/1960 | Smith | 367/75 |
| 3,302,164 | 1/1967 | Waters et al. | 367/75 |
| 3,378,096 | 4/1968 | Cherry | 367/31 |
| 4,001,773 | 1/1977 | Lamel et al. | 340/18 |
| 4,298,970 | 11/1981 | Shawhan et al. | 367/82 |
| 4,321,981 | 3/1982 | Waters | 367/75 |
| 4,363,112 | 12/1982 | Widrow . | |
| 4,365,322 | 12/1982 | Widrow . | |
| 4,562,559 | 12/1985 | Sharp et al. | 367/82 |
| 4,635,238 | 1/1987 | Gallagher et al. | 367/75 |
| 4,686,657 | 6/1987 | Dellinger et al. | 367/75 |
| 4,715,451 | 12/1987 | Bseisu et al. . | |
| 4,831,600 | 5/1989 | Hornby et al. | 365/31 |
| 4,954,998 | 9/1990 | Rector | 367/82 |
| 4,965,774 | 10/1990 | Ng et al. | 367/75 |
| 4,992,997 | 2/1991 | Bseisu | 367/82 |

FOREIGN PATENT DOCUMENTS 8804435 6/1899 PCT Int'l Appl. .

OTHER PUBLICATIONS

Rector II and Marion, "Extending VSP to 3-D and MWD: Using the drill bit as downhole seismic source", *Oil & Gas Journal*, pp. 55–58, Jun. 1989.
Rector, et al. "Use of Drill-Bit Energy as a downhole Seismic Source", *58th International Meeting of SEG*, paper DEV 2.7 (1988), pp. 161–164.
DiSiena, et al., "VSP While Drilling: Evaluation of TOMEX", *Exploration Technology Report* (Atlantic Richfield Company, Fall 1989), pp. 13–20.
Waters, et al., "Reflection Seismology", Wiley & Sons, 3d ed., pp. 188–193; pp. 418–421.

(List continued on next page.)

*Primary Examiner*—Nelson Moskowitz
*Attorney, Agent, or Firm*—Vinson & Elkins

[57] ABSTRACT

A method of analyzing vibrations transmitted along a structure such as a drill string is disclosed. The detected vibrations include both axial and torsional vibrations generated from the same location, so that the time delay between the two, due to the difference in axial and torsional velocities, can be determined. After deconvolution to take into account the non-ideal frequency response of the structure, such deconvolution preferably retaining the values of the transmission time for each component, one of the time series is shifted by the amount of the time delay, so that the vibrations generated from the same location coincide. A weighted sum of the two representations will provide reinforcement of the desired signal. The method may be used in determining a seismic source signature in prospecting where a drill bit is the source, in analyzing drilling parameters from drill string vibrations, and in stress wave telemetry.

7 Claims, 5 Drawing Sheets

OTHER PUBLICATIONS

Drumheller, "Acoustical Properties of Drillstrings", *J. Acoustic Society of America*, 95(3) (Mar. 1989), pp. 1048–1064).

Aarrestad and Kyllingstad, "Experimental and Theoradical Study of a Coupling Mechanism Between Longitudinal and Torsional Drillstring Vibrations at the Bit", *SPE Drilling Engineering*, pp. 12–18, Mar. 1988.

Chin, "Formation Evaluation Using Realtime 'VS$^2$P' Profiling", paper 19446 (Society of Petroleum Engineers, 1989).

Katz, "Drill bit location, guidance by seismic seen feasible", Oil & Gas Journal, pp. 197–200, Jul. 1980.

"Tomex Field System" (Western Atlas International).

"Seismic-While-Drilling" (Western Atlas International, 1988).

"Information Required for TOMEX Survey" (Western Atlas International).

"TOMEX Checkshot Survey Seismic-While-Drilling", (Western Atlas International).

"Seismic-While-Drilling TOMEX Survey" (Western Altas International).

Drumheller, "Acoustical Properties of Drill Strings", paper SAND88-0502 (Sandia National Laboratories, Aug. 1988).

Rector III and Marion, "MWD VSP and Checkshot Surveys Using the Drill Bit as a Downhole Energy Source".

*Offshore Technology Conference* (May 1989), paper OTC 6024, pp. 497–506.

Rector III and Weiss, "Real-Time Drill-Bit VSP From an Offshore Platform", *59th Annual Meeting of SEG* (1989).

METHOD FOR REDUCING NOISE EFFECTS IN ACOUSTIC SIGNALS TRANSMITTED ALONG A PIPE STRUCTURE

The present application is a continuation of copending application Ser. No. 746,172, filed Aug. 14, 1991, now U.S. Pat. No. 5,130,951, issued Jul. 14, 1992, which is a continuation of application Ser. No. 564,621, filed Aug. 8, 1990, now abandoned.

This invention is in the field of signal processing, and is more specifically directed to reducing the effects of noise in signals transmitted along a pipe structure.

BACKGROUND OF THE INVENTION

The petroleum industry relies heavily on the operation of drilling into the earth, both on land and offshore, in the exploration for and production of petroleum products. Over the years, the more readily found and accessible petroleum reservoirs have of course been discovered and depleted first. As a result, the exploration and production operations must necessarily concentrate to a greater degree on less accessible and less readily discoverable reserves. In order to reach these locations, the depths of drilling have increased, the locations at which drilling takes place have become increasingly difficult and less accessible, and the drilling operations have necessarily become more complex. Accordingly, drilling operations in the search for and production of petroleum products have become more expensive, with this trend likely to continue in the future. Because of this increasing cost, the accuracy and efficiency of the drilling operation is becoming even more important.

The success and efficiency of the drilling operation depends to a large degree on the quantity and quality of information that the drilling operator has about the sub-surface structure into which the drilling is taking place, and also about parameters concerning the operation of the drill bit as it proceeds into the earth. Many techniques for acquisition and communication of such information have been tried and used in the industry. Recent work has been done, as will be discussed hereinbelow, in acquiring information from the acoustical vibrations in the drill string itself during drilling. In such an application, the drill string serves not only to power and guide the drilling, but also as a communication medium for such acoustic signals. These signals are inherently generated during the drilling operation and communicated via the drill string to detectors. Analysis of the signals provides information about the drilling parameters and the drilling operation itself, and also about the geology into which the drilling is taking place.

An example of a system and method using acoustic vibrations transmitted along the drill string itself to communicate various drilling parameters is described in U.S. Pat. No. 4,715,451, issued Dec. 29, 1987, assigned to Atlantic Richfield Company, said U.S. Pat. incorporated herein by this reference. This system measures the motion of, and the strains on, a drillstem in various directions, by way of monitoring such indications as axial, torsional and lateral vibrations, and deflections of the drillstring. The strain generated on the drill string during drilling is indicative of such factors as the impact and rotation of the drill bit, its interaction with the formation into which the drilling is taking place, and the interaction with portions of the drill string above the bit with the surrounding formation. In this system, measurements are made by way of detectors, such as accelerometers and strain gages, which are located in a sub near the top of the drill string and which generate electrical signals corresponding to the vibration and motion detected thereby. Analysis of the electrical signals provides real-time information on parameters such as drillstem vibration and deflection, the location of interaction between the casing and the drillstem, the speed of and load on the drill bit, and other drill bit operating characteristics. Such real-time operating information is quite useful in efficiently and accurately performing the drilling operation.

As disclosed in said U.S. Pat. No. 4,715,451 at column 5, lines 59 through 68, in Rector III, et al., "Extending VSP to 3-D and MWD: Using the drill bit as downhole seismic source", *Oil and Gas Journal*, (Jun. 19, 1989), pp. 55–58, and in Rector, Marion and Widrow, "Use of Drill-Bit Energy as a Downhole Seismic Source", *58th International Meeting of SEG*, paper DEV 2.7, pp. 161–164, analysis of the vibrations communicated along the drill string during drilling is useful in the seismic prospecting area, where the vibrations generated by the drill bit into the earth are the seismic source signals. Relative to the TOMEX® (Trademark of Western Atlas International Inc.) system disclosed by Rector III et al., seismic detectors such as geophones or hydrophones detect the reflections of these vibrations near the surface at a location distant from the drilling operation. Detection of the vibrations at the wellhead, as communicated by the drill string, can provide a signature of the source vibrations. Conventional time-domain cross-correlation of the vibrations detected by the geophones or hydrophones with the source vibrations communicated through the drill string provides data concerning the location of sub-surface strata and interfaces.

Another system which utilizes the drill string as a medium for the transmission of data is referred to as stress wave telemetry. Stress wave telemetry systems are disclosed in copending U.S. patent applications Ser. No. 188,231 filed Apr. 12, 1988, now U.S. Pat. No. 4,992,997, issued Feb. 12, 1991, Ser. No. 554,030 filed Jul. 16, 1990, and in Ser. No. 554,022 filed Jul. 16, 1990, all applications also assigned to Atlantic Richfield Company, and incorporated herein by this reference. This system includes transmitters, such as solenoids eccentric motors, and piezoelectric transducers, which intentionally vibrate the drill string in a manner corresponding to the desired data. This data may include information concerning drilling parameters, such as in the above-referenced U.S. Pat. No. 4,715,451. In the case of stress wave telemetry, however, the information is not extrapolated from analyzing the naturally occurring vibrations, but vibrations are generated which are in addition to the naturally occurring vibrations, these generated vibrations corresponding to the drilling parameter and other information transmitted along the drill string.

It has been discovered, however, that vibrations, whether from the drill bit itself or intentionally generated by transmitters, are not communicated through the drill string in an ideal manner, due to the non-ideal response of the drill string to such vibrations. As described in Drumheller, "Acoustical Properties of Drillstrings", *J. Acoustic Society of America*, 85(3) (March, 1989), pp. 1048–1064, conventional drill strings, which consist of a number of lengths of drill pipe joined by pipe joints, inherently have frequency domain stopbands which attenuate acoustical signals at the stopband frequencies. This frequency-dependent attenuation can severely distort some signals. While simple deconvolution of the reflective effects of the ends of the drill string and the bottomhole assembly has been done, such deconvolution has accounted only for effects dependent upon the total length of the drill string and the construction of the bottomhole assemble, and has not accounted for the frequency dependent transmission of the drill string due to such factors as the tool joints between sections of the drill string.

Furthermore, it has been discovered that other factors also distort the vibrations communicated along a drill string from downhole to the surface. Such factors include noise generated by the drilling fluid, or mud, which is conventionally pumped through the drill string at relatively high pressures. This high pressure flow of fluid causes significant vibrations in the drill string. Other apparatus in the drilling operation, such as bearings in the swivels at the top of the drill string, the rattling of chains which turn the kelly bushing, or the motor in a top drive drilling arrangement, and the slap of the casing against the drill string or well bore, also generate significant acoustical vibrations which are received by and transmitted along the drill string. These vibrations are superimposed upon the vibrations generated by the drill bit, and will accordingly be detected at the top of the drill string by such detectors as are attempting to detect the vibrations which are induced by the drill bit.

Considering the vibrations generated by the drill bit, or alternatively the vibrations generated by a transmitter in the stress wave telemetry case, as "signal", and considering the other vibrations caused by drilling mud flow and the mechanical sources discussed in the prior paragraph as "noise", it has been found that the amplitude of the noise can be 1000 times greater than the signal amplitude. Noise at this level not only clouds the analysis of the information, but indeed drowns out the information itself. This is true in the contexts of determining real-time drilling parameters, producing a source signature from the drill bit for seismic prospecting, and in the case of stress wave telemetry.

The presence of such noise and distortion has been observed in field tests of the TOMEX® system described hereinabove, by J. P. DiSiena et al., "VSP While Drilling: Evaluation of TOMEX", *Exploration Technology Report* (Atlantic Richfield Company, Fall 1989), pp. 13-20, incorporated herein by this reference. While recovery of the drill-bit signal in the seismic prospecting context could be done in drilling operations using tricone bits and rotary drive, the signal-to-noise ratio for operations using PDC (Polycrystalline Diamond Compact) bits or a downhole mud motor was so low that no seismic source record could be detected in the drill string vibrations. The signal-to-noise ratio of the drill-bit energy as transmitted along the drill string must therefore be improved in order for such seismic prospecting analysis to be feasible during drilling, when using such important drilling equipment.

It is therefore an object of this invention to provide a method of reducing the effects of noise on information communicated along a pipe structure such as a drill string.

It is a further object of this invention to provide such a method which also includes the deconvolution of the pipe string response in accomplishing the noise reduction.

It is a further object of this invention to provide such a method together with an improved deconvolution, taking into account the passbands and deadbands of a jointed pipe structure.

Other objects and advantages of the invention will be apparent to those of ordinary skill in the art having reference to this specification, together with the drawings.

SUMMARY OF THE INVENTION

The invention may be incorporated into a method for processing signals corresponding to vibrations in a pipe structure. Measured axial and torsional vibrational signal as a function of time are received at an end of the structure. The torsional component is generally delayed in time from the axial component, due to the lower velocity of torsional waves along the structure. The time series of the vibration signals are shifted in time by approximately the difference in the axial and torsional velocities times the distance between the detector and the drill bit, or such other source of the vibrations in interest. In cases where the axial and torsional vibrations are substantially proportional to one another, such as when the vibration source is the drill bit, and since the noise is substantially random, addition of the axial and torsional signals will cause the vibration signals to reinforce one another. As a result, an improved signal to noise ratio in the detected vibration signals is achieved.

BRIEF DESCRIPTION OF THE DRAWINGS

FIG. 3a is a time domain representation of a source signal transmitted into the drill string of FIG. 1.

FIGS. 3b and 3c are time domain representations of axial and torsional vibrations, respectively, measured at the top of the drill string of FIG. 1, illustrating both signal and noise, responsive to the source signal of FIG. 3a.

DETAILED DESCRIPTION OF THE PREFERRED EMBODIMENT

Figure 1:
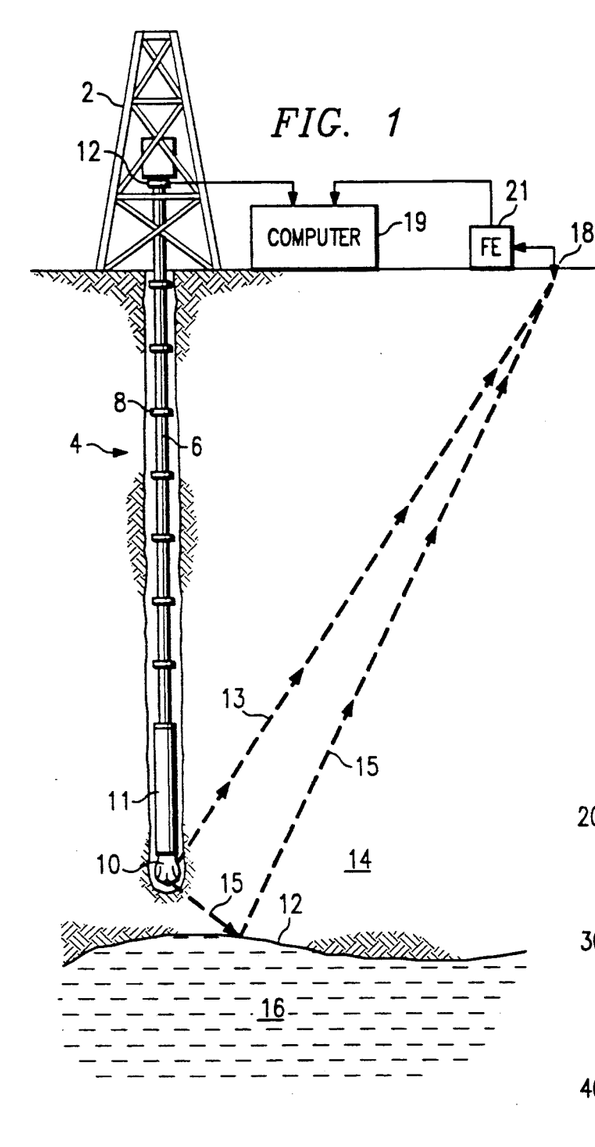
FIG. 1 is a schematic diagram of a drilling operation, illustrating an application of the embodiment of the invention.

Referring now to FIG. 1, a drilling operation with which a preferred embodiment of the invention is used will be described. A conventional drilling rig 2 is shown as powering drill string 4, which conventionally consists of multiple sections 6 of drill pipe. Sections 6 are connected to one another by tool joints 8 in the conventional manner. Drill bit 10 is connected at the distal end of drill string 4, and can be a rotary bit, jet or spud bit, or other type of drill bit conventional in the art. As shown in Figure drill bit 10 is connected to bottomhole assembly 11, which in turn is connected to sections 6 of drill string 4. Provision of such a bottomhole assembly 11 is conventional in the drilling art, and is useful for housing such equipment as detectors for sensing attributes of the drilling operation, as well as for other conventional functions. While such a bottomhole assembly 11 is shown in FIG. 1, it should be noted that the presence of bottomhole assembly 11 is not required for purposes of the instant invention, such presence depending upon the particular drilling operation being performed. However, for purposes of stress wave telemetry as will be described hereinbelow, transducers for vibrating drill string 4, according to information to be transmitted from downhole to the surface, are preferably located in such a bottomhole assembly 11.

It is contemplated that the rotary bit, due to its mode of operation in drilling, will generate quite complex vibrational information, such information being transmitted, and capable of being subsequently analyzed according to this embodiment of the invention. The vibrational information utilized by this embodiment of the invention include axial compressional vibrations and torsional vibrations in drill string 4, such vibrations being generated by the powering of drill bit 10 and its interaction (as well as the interaction of drill string 4) with the formations encountered in the earth. The powering of drill bit 10, of whatever type, can be done either from the surface or via a downhole motor, according to the type of drill bit 10 used and the particular drilling operation undertaken.

Sub 12 is connected within drill string 4 near the surface of the earth. Sub 12 contains detectors, such as accelerometers, strain gages, piezoelectric transducers, and the like, for detecting vibrations in drill string 4 and generating a signal, such as an electrical signal, corresponding to the detected vibrations. Examples of such detectors and their placement in sub 12 are described in U.S. Pat. No. 4,715,451 issued Dec. 29, 1987, assigned to the Atlantic Richfield Company, and incorporated herein by this reference. For purposes of this invention, since both axial and torsional vibrations are detected and used in the analysis, such detectors must accordingly be placed and oriented to detect both axial and torsional vibrations. The electrical signals generated from the detectors within sub 12 are communicated to computer system 19 for analysis of the signals corresponding to the vibrations of drill string 4, according to the embodiment of the invention described hereinbelow.

As described in said U.S. Pat. No. 4,715,451, the vibrations detected by the detectors in sub 12 are representative of certain drilling parameters. Analysis of these vibrations, as communicated electrically from the detectors in sub 12, can quantify these drilling parameters, assuming that those vibrations from drill bit 10 can be sufficiently separated from such other vibrations along drill string 4 which are not generated from drill bit 10. Accordingly, an important application of the invention as described herein relative to its preferred embodiment is the reduction of the effects of the vibrations from sources not of interest (i.e., the "noise") on the vibrations generated by the operation of drill bit 10 and drill string 4 on the sub-surface formations which are of interest (i.e., the "signal"). As a result of such improvement of the signal-to-noise ratio, it is contemplated that the drilling operation can be more efficiently performed and controlled, as the quality of real-time information about important drilling parameters is improved by the use of this invention.

Alternatively, or in addition, to the above utilization of this information, the vibrations sensed by detectors in sub 12 can be used in seismic prospecting. As described in the Rector III et al. article cited hereinabove, the vibrations generated by drill bit 10 during the drilling operation are transmitted through the earth. It is believed that the vibrations which are transmitted axially along drill string 4 from drill bit 10 correspond to pressure ("P") waves which drill bit 10 imparts into the earth. These vibrations, when reflected below the surface of the earth and received at locations remote from the drilling operation, are indicative of the attributes of these sub-surface strata and their interfaces.

As shown in FIG. 1, the vibrations generated by drill bit 10 are transmitted acoustically through the earth. For example, vibrations may follow path 15 downwardly from drill bit 10, reflecting from interface 12 between strata 14 and 16 to the surface, at which the vibrations are detected by detector 18. Vibrations may also directly travel from drill bit 10 along path 13 to detector 18. Detector 18 may be a conventional geophone, or other conventional apparatus useful in the detection of vibrations at the surface of the earth (or water, as the case may be). While a single detector 18 is illustrated in FIG. 1, it should be noted that, of course, multiple detectors 18 are conventionally placed along the surface of the earth during seismic prospecting. The use of an array of multiple detectors 18 provides detailed information about the sub-surface geology of the region under analysis. The analysis of the detected vibrations by each of such multiple detectors 18 is done in much the same manner as for a single detector 18, with the differences in travel times among the detectors 18 in the array indicative of the strata and interfaces at different locations. The vibrations detected by detector 18, as well as those detected by detectors in sub 12, are communicated in the conventional manner via field electronics 21 to computer system 19 for analysis according to the method to be described hereinbelow.

As described in the article by Rector III, et al. cited hereinabove, seismic prospecting using drill bit 10 as the seismic source, as with any seismic source, requires knowledge of the input signal so that reflections and other information can be gleaned from the reflected signal received by geophone 18. Conventional methods, such as cross-correlation of the received signal with the input signal as in the well-known Vibroseis ® (Registered trademark of Continental Oil Company) technique, and performed by computing system 19 either on location in the field, or alternatively at an off-site computing center, identify such important parameters in the received information such as transit time from the source (i.e,. drill bit 10) to the geophone 18, which will indicate the location of reflecting strata or interfaces.

However, where drill bit 10 is the seismic source and where detectors, for example in sub 12, are used to measure the source signal as transmitted through drill string 4, the vibrations received via transmission through drill string 4 will include any effects of the response of the drill string 4 upon the vibrations generated by drill bit 10. As noted in the Drumheller article noted hereinabove, the response of a drill string to vibrations passing therethrough is such that severe distortions of the acoustic signal will occur as the signal travels to and is received by the detectors in sub 12, at or near the surface of the earth. In the seismic prospecting application, it should be noted that the signal received by geophone 18 will not have the distortions generated by the acoustic response of drill string 4, but will be subject to distortions presented by the earth. Of course, in the seismic prospecting application, such distortions are the very information which is sought by the process, as the distortions (e.g., reflections) correspond to the geology of the drilling location. Furthermore, as noted hereinabove, the vibrations from drill bit 10 which are transmitted along drill string 4 will have superimposed thereupon such "noise" vibrations resulting from the flow of drilling mud at high pressure, and the operation of various mechanical elements on drill string 4, as discussed hereinabove.

As is well known in the field of seismic prospecting, correlation techniques determine the time delay between the source signal and the receipt of the reflected signal; from this time delay, the depth and location of reflecting strata and interfaces between strata can be calculated. The accuracy of these calculations depends upon how well the analysis can recognize the point in time at which the reflected signal is detected. Due to the presence of noise in the measurements, as well as the weakness of the seismic signal, especially those resulting from partial reflections from very deep strata, this identification of the receipt of the measured signal is often not easily accomplished. This process is made even more difficult where the signature of the source signal is not known, is distorted, or is otherwise inaccurate due to additional noise superimposed thereupon. As noted above, where the vibrations are distorted in transmission through drill string 4 in a way in which the vibrations traveling through the earth are not distorted, and where significant noise is generated by the flow of drilling mud and other mechanical interactions, the ability to accurately cross-correlate the source signal with the reflected waveforms becomes even more reduced.

Also as noted above, stress wave telemetry is another application in which vibrations of a drill string 4 are analyzed for their informational content. Of course, whether the signals are inherent in the vibrations generated during drilling, as discussed above, or induced by additional equipment such as transducers located in downhole assembly 11, as in the case of stress wave telemetry, noise and distortion of the signal occur during transmission through drill string 4. Furthermore, considering the amplitude of signals which can be generated by downhole transducer as are described in said copending application Ser. No. 188,231 filed Apr. 21, 1988, now U.S. Pat. No. 4,992,997, issued Feb. 12, 1991, where such transmitting apparatus is of limited size and power due to its installation downhole, signal-to-noise ratio and distortion is a serious problem, even where the frequencies of transmission may be known in advance, as is the case in stress wave telemetry.

Figure 2:
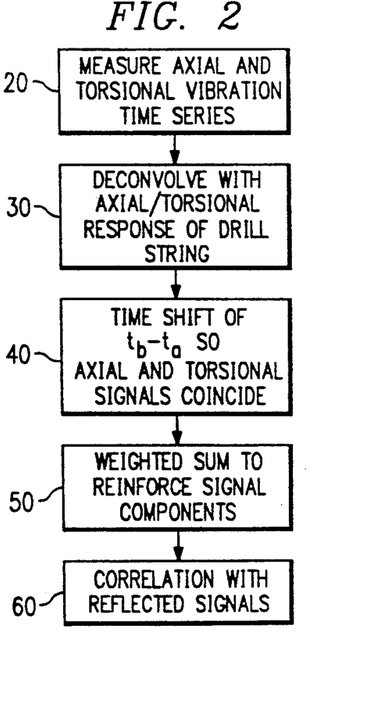
FIG. 2 is a flow chart illustrating a method according to the preferred embodiment of the invention.

Referring now to FIG. 2, a method for reducing the effects of noise on detected vibrations transmitted through a pipe structure such as drill string 4 according to the preferred embodiment of the invention will now be described. The method begins at process 20, at which both axial and torsional vibrations in drill string 4 are measured by detectors in sub 12 near the surface of drill string 4. As described hereinabove, these detectors are conventional accelerometers, strain gages, piezoelectric transducers and the like; an example of a system including such detectors is described in the above-referenced U.S. Pat. No. 4,715,451.

It is contemplated that conventional computer equipment, programmed according to the method according to this embodiment of the invention, may be used in performing this preferred embodiment of the invention. An example of a conventional computer system particularly adapted to the task of seismic prospecting using the drill bit as a seismic source is the TOMEX ® Field System manufactured and sold by Western Atlas International. Other conventional computer systems such as microcomputer-based workstations may of course be used in performing this embodiment of the method, as well. In particular, certain special purpose microprocessor circuits, commonly referred to as digital signal processors (DSPs), are constructed to rapidly perform operations useful in digitally performing Fourier transforms, such transforms accomplished according to the class of methods conventionally referred to as Discrete Fourier Transforms (DFTs), an important type of which are commonly referred to as Fast Fourier Transforms (FFTs). Readily available add-on circuit boards containing such DSP processors, for use in a microcomputer-based workstation, are particularly well-suited for performing the process steps of FIG. 2, including the deconvolution operation discussed herein.

Figure 8:
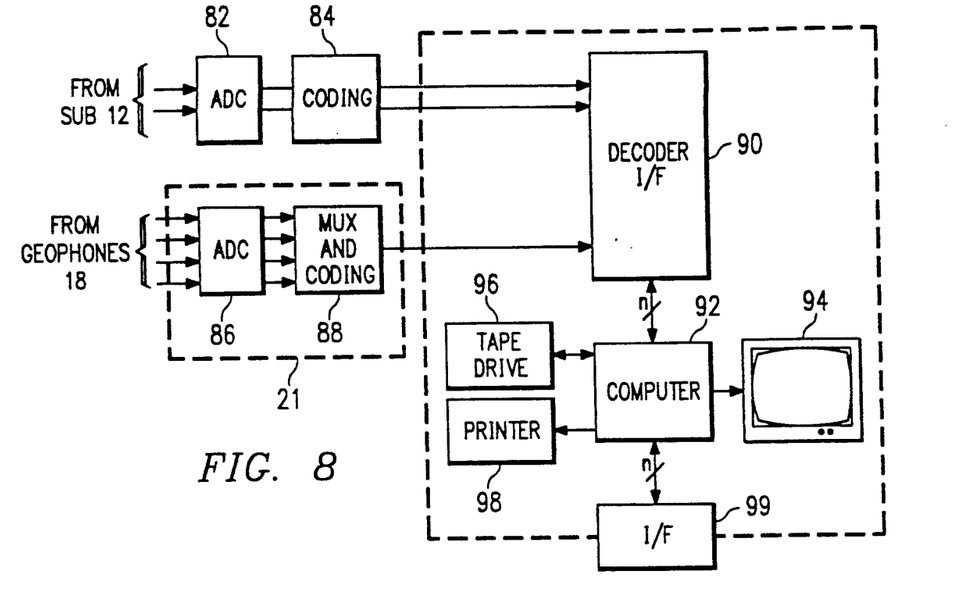
FIG. 8 is an electrical diagram, in block form, of a computing system for receiving and processing method according to the preferred embodiment of the invention.

Referring to FIG. 8, a block diagram of an example of a computing system 19 for performing the analysis according to this embodiment of the invention will now be described. Computing system 19 of FIG. 8 receives information both from detectors in sub 12, and also from geophones 18 via field electronics 21, and accordingly is applicable for analysis of information from seismic prospecting where drill bit 10 is the seismic source and geophones 18 receive the reflected signals, as in FIG. 1. Of course, computing system 19 may be constructed to receive only input from detectors in sub 12, for analyzing vibrations in drill string 4 to determine certain drilling parameters, or in the stress wave telemetry application, as described hereinabove.

Detectors in sub 12 provide analog electrical input responsive to torsional and axial vibrations detected in drill string 4, to analog-to-digital converters (ADC) 82. ADCs 82 convert the analog signals received from each of the detectors in sub 12 into digital form in the conventional manner. ADCs 82 communicate the digital representations of the vibrations, either from each of the detectors or in a multiplexed manner, to coding circuit 84 which converts the digital data into signals suitable for transmission to computing system 19. The conversion by coding circuit 84 is according to conventional data transmission techniques, for example by coding the information into frequency shift keyed (FSK) digital data, phase shift keyed (PSK) digital data, or another conventional coding scheme. Coding circuit 84 then transmits the coded information concerning the vibrations detected at sub 12 to computing system 19; such transmission may be by way of synchronous digital data transmission, or by microwave or infrared transmission, all of which being conventional for the transmission of digital data.

Similarly, field electronics 21 includes ADCs 86 for receiving and digitizing analog signals received from geophones 18. ADCs 86 communicate the digital signals to multiplexer and coding circuit 88, which multiplexes the data received from the multiple geophones 18, and transmits the data to computing system in similar manner as coding circuit 84 described hereinabove. As noted above, in the stress wave telemetry and drilling parameter communication applications, field electronics 21 need not be provided, as no inputs from geophones 18 are necessary in such analysis.

Computing system 19 includes interface 90 for receiving the coded and transmitted signals from coding circuit 84 and from multiplexer and coding circuit 88, and for communicating the received signals to computer 92 in a manner which can be stored and manipulated thereby. Computer 92 is a conventional high speed PC-based workstation, for example based on 80386 or 80486 microprocessors. Due to the nature of the method to be described hereinbelow, it is also preferable that computer 92 include one or more DSP add-on boards as described above; a preferred DSP board is the Spirit 30 DSP board manufactured and sold by Sonitec. Computer 92, as mentioned above, includes conventional hardware, including the DSP boards, but is programmed to perform the analysis to be described according to the preferred embodiment of the invention hereinbelow. Computer 92 may be connected to monitor 94, tape drive 96, printer 98 or interface 99, for communication and storage of the results in the conventional manner.

It should be noted that the time series of vibrational signals which are analyzed according to this embodiment of the invention may be a continuing series of signals, so that the analysis occurs periodically, but on substantially a real-time basis. Computing system 19 thus can be located in the field for iterative analysis during drilling. Such analysis is preferable for the application discussed hereinabove relating to the real-time receipt of drilling parameters during the drilling operation, as described in said U.S. Pat. No. 4,715,451. Alternatively, a time series of vibrations may be received and analyzed later, together with such other information as the received reflections from geophone 18. Such computation may be done by computer system 19 located at the drilling site, or alternatively may be done by a computing system located remote from the drilling site, at a time after the drilling is complete, so long as the raw time series data is retained or transmitted.

Figure 3:
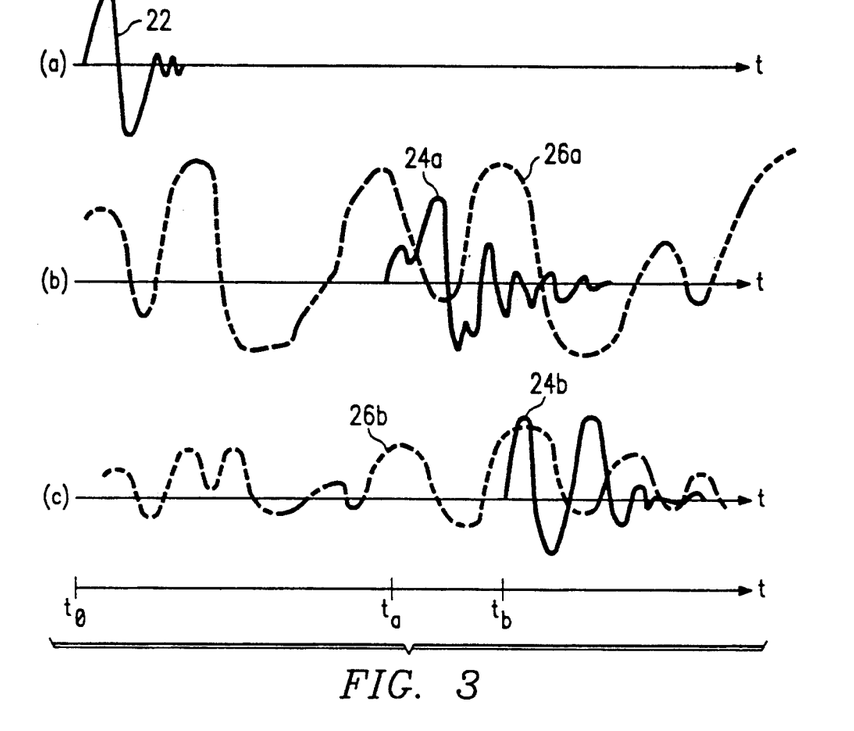

FIG. 2 illustrates the steps in the method according to this embodiment of the invention. For purposes of describing the benefits of the invention and its theory of operation, time domain and frequency domain waveforms will be used hereinbelow. Referring to FIGS. 3a through 3c, time domain representations of a typical signal as transmitted near drill bit 10, and as detected for both axial and torsional components near the top of drill string 4, will be discussed. FIG. 3a illustrates an example of signal 22 as generated by, or near, drill bit 10, with signal 22 represented in the time domain. This signal is substantially an impulse beginning at time $t_0$ and, for purposes of this discussion, is presumed to generate substantial vibrations both axially and torsionally along drill string 4.

For a drill string 4 having a given length between drill bit 10 and the location of sub 12, including detectors for both axial and torsional vibrations, near the surface, the source signal illustrated in FIG. 3a will be detected (process 20 of FIG. 2) at a point in time delayed from the generation of the signal. It is known that axial compressional vibrations have a higher velocity in a pipe structure such as drill string 4 than do torsional vibrations. In conventional steel drill pipe, for example, the of axial vibrations is approximately 16,850 ft/sec, while the velocity of torsional vibrations is approximately 10,650 ft/sec. Accordingly, the torsional vibrations induced by the same event as axial vibrations will exhibit a time shift dependent upon this difference in velocity and the length of drill string 4 between drill bit 10 (or such other apparatus which causes the vibration) and sub 12, at which the vibrations are detected.

The result of the measurement is a time series of vibration amplitude over time, an example of which is shown in FIG. 3b for axial compressional vibrations and in FIG. 3c for torsional vibrations. FIG. 3b illustrates a time domain representation of detected signal 24a, which begins at a time $t_a$, delayed from time $t_0$ by the length of drill string 4 times the axial velocity of vibrations in drill string 4. FIG. 3c similarly illustrates a time domain representation of detected signal 24b, beginning at a time $t_b$ equal to the torsional velocity of vibrations in drill string 4 times the length of drill string 4. It should be noted that the amplitude of the signals 24a and 24b represented in FIGS. 3a and 3b is not necessarily at the same scale as the source signal, as significant attenuation is likely through drill string 4.

It should also be noted that the representation of signals 24a and 24b in FIGS. 3b and 3c are not in the form that they would be actually detected by detectors in sub 12, but instead separately illustrate signal components 24a and 24b, and noise components 26a and 26b. Of course, the actual time series of the vibrations detected by detectors in sub 12 would not have the signal and noise components separated as shown in FIGS. 3b and 3c, but would be the sum of the two components 24 and 26 for each of the FIGS. For purposes of explanation of the method of this embodiment of the invention, however, the two components will be separately illustrated, even though in practice, at this step, the shape of the signal component 24 is not known.

Noise components 26a and 26b, generated from the factors discussed above, have an amplitude which is quite significant relative to the amplitude of the signal 24a and 24b. While these relative amplitudes are illustrative of the noise problem encountered, it should be noted that observed values of the amplitude of the noise components 26 have been on the order of one thousand times the amplitude of the signal components 24; accordingly, the illustrated relative amplitudes of FIGS. 3b and 3c are not to scale.

It should also be noted that noise components 26a and 26b are broadband noise, i.e., a wide range of frequencies. The noise generated along drill string 4 also may have periodic and non-periodic components, depending of course upon the physical cause of the particular component of the noise. For example, the flow of drilling mud may generate relatively periodic noise, although at multiple frequencies and harmonics of such frequencies. Other events, such as casing slap, may not be periodic and will generate noise accordingly. Due to these factors, noise components 26, illustrated in FIGS. 3b and 3c for purpose of explanation, may not be representative of actual noise detected by detectors in sub 12.

The method of this embodiment of the invention treats noise components 26a and 26b as random noise. Of course, such noise is not truly random, since physical events generate the axial and torsional noise vibrations. As will be discussed below in further detail, the torsional and axial signal components 24 can be treated as proportional to one another at the times of interest, while the torsional and axial noise components 26 do not have this relationship. This may be seen intuitively by considering that axial signal component 24a and torsional signal component 24b are proportional, as generated by the same physical events at the same time, but time shifted as measured due to the velocity difference. On the other hand, axial noise component 26a and torsional noise component 26b, although also generated by same physical events and traveling at different velocities, are generated at points along drill string 4 other than that of interest for the signal (i.e., not at drill bit 10). It will be seen that by "zooming" in to a particular location of interest such as the location of drill bit 10, according to this embodiment of the invention, noise components 26a and 26b will not coincide with one another, and will appear as random noise in the analysis.

It should further be noted from a comparison of torsional noise component 26b to axial noise component 26a that, in this example, torsional noise component 26b has a relatively lower amplitude than axial noise component 26a. It has been found that it is not uncommon for vibrational noise of one component to have a relatively larger amplitude than that of another component; of course, depending on the particular situation, the relative amplitudes of the noise ma be substantially equal for both the axial and torsional components. The method according to this embodiment of the invention, as will be described hereinbelow, can take into account such differences in the relative amplitudes of noise components 26a and 26b, in reducing the effects of such noise in analysis of the desired signal.

Figure 4A:
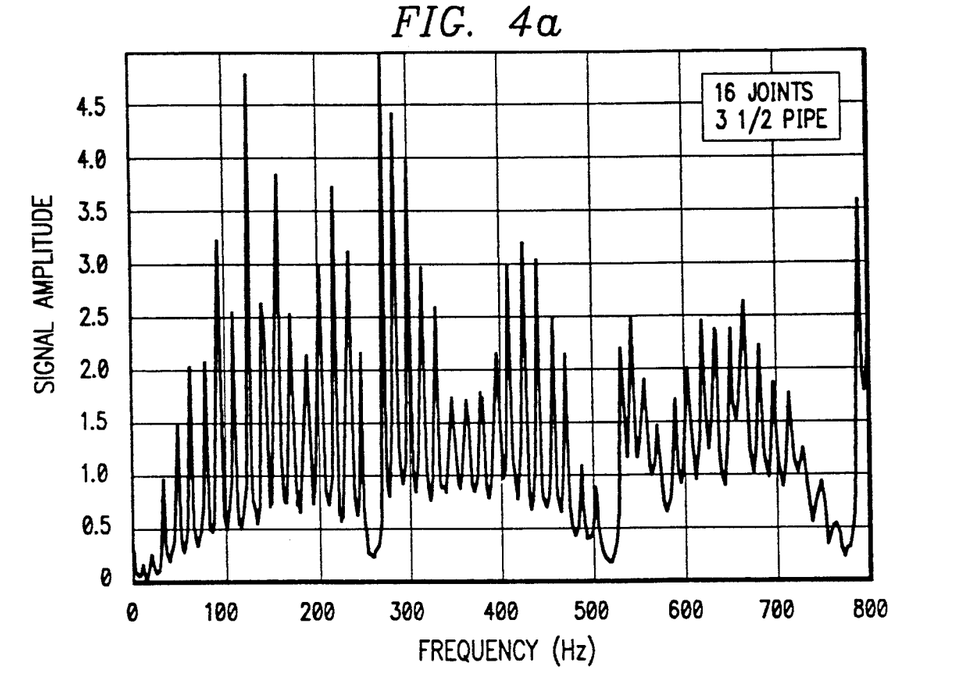
FIGS. 4a and 4b are frequency domain representations of the impulse response of a drill string to axial and torsional vibrations, respectively.
Figure 4B:
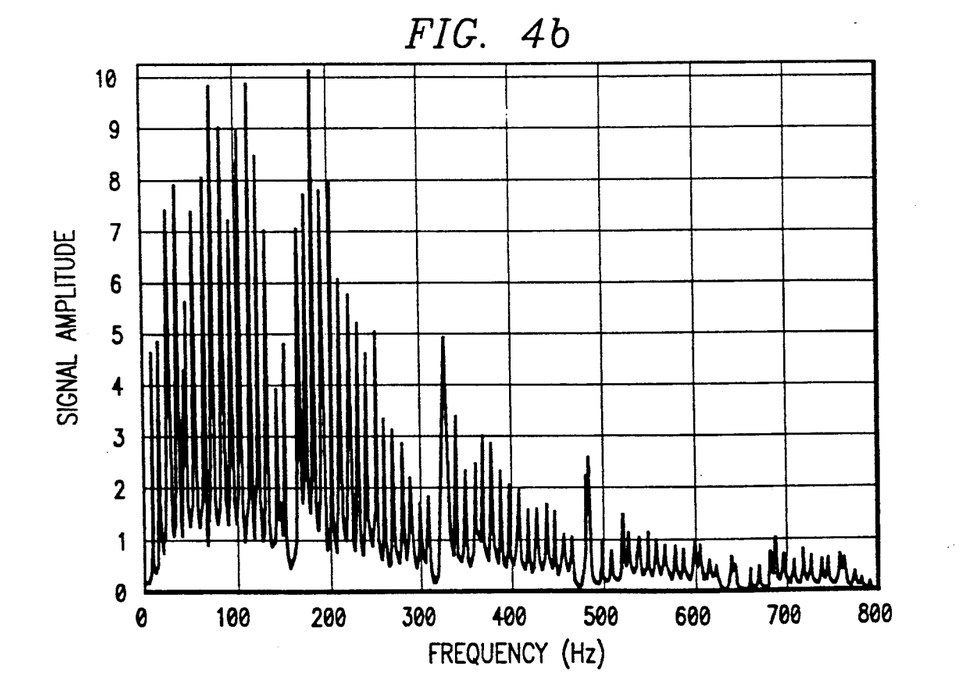

It is apparent from a comparison of FIGS. 3b and 3c to each other, and to FIG. 3a, that not only is the noise component 26 significant, but also that the signal components 24 are distorted from the source signal of FIG. 3a, and distorted differently for axial vibrations relative to torsional vibrations. Referring to FIGS. 4a and 4b, the frequency response of a typical drill string 4 to impulse inputs of axial and torsional vibrations, respectively. Comparison of the axial and torsional frequency response characteristics of FIGS. 4a and 4b will illustrate this differing distortion.

FIG. 4a shows the frequency response of a drill string 10 to compressional axial vibrations. The actual data taken for this frequency response characteristic is the response of a drill string 4 consisting of sixteen sections 6 of 3½ inch pipe, each section approximately 31 feet in length. The input used to measure this frequency is response a hammer blow, which easily provides a wide band of frequencies in an above-ground testing mode. The frequency range for this plot is from 0 Hz to 800 Hz, although it should be noted that higher frequency vibrations generated by the hammer blow impulse will also pass along such a drill string 4, although attenuation of these vibrations increases with the frequency of the vibration.

As shown in FIG. 4a, it should be noted that dead bands occur at approximately 260 Hz, 520 Hz, and 780 Hz. These dead bands result from reflections of the compressional axial vibrations within a single section 6 of drill string 4. One can calculate an approximate base dead band frequency for a single section of pipe by dividing the velocity of compressional axial vibrations (approximately 16,000 ft/sec) by twice the length of the section. Accordingly, for a section approximately 31 feet long, the dead band frequencies for compressional vibrations is on the order of 260 Hz. For a drill string 4 having multiple sections 6, each of approximately the same length, the dead band frequencies, including the base dead band frequency and its integral harmonics, will align substantially with each other in the frequency response characteristic, as is evident in FIG. 4a. Based on other measurements, it is believed that the major deadbands shown in FIG. 4a for axial vibrations (i.e,. at integral multiples of 260 Hz) are substantially independent of the number of sections 6 in the drill string 4, so long as the lengths of the sections 6 are substantially the same, as is conventionally the case in the drilling art. It has also been determined that the frequencies of the major deadbands to axial vibrations is also substantially independent of the size of the drill pipe of sections 6.

Between the major dead band frequencies at multiples of 260 Hz, frequency response characteristic of FIG. 4a has pass bands of relatively high amplitude. Accordingly, a compressional axial vibration at a frequency between the dead band frequencies passes along drill string 4 relatively well. However, between the major deadbands at integral multiples of 260 Hz, smaller local deadbands and passbands are also present. In the characteristic of FIG. 4a, the passbands manifest as sixteen peaks in the characteristic. These sixteen peaks correspond to the number of sections 6 in drill string 4, with the number of local passbands increasing with the number of sections 6 in drill string 4. It should be noted that the local deadbands between the major deadbands in the characteristic of FIG. 4a attenuate the vibrations at those frequencies to a lesser degree than occurs in the major deadbands.

FIG. 4b illustrates the frequency response characteristic to torsional vibrations of drill string 4, having sixteen sections 6 of 3½ inch drill pipe. Comparison of this characteristic with that of FIG. 4a shows that the shape of the frequency response characteristic is similar for the two components of vibration, but that the major deadband frequencies are different. As discussed above, for a pipe of a given length, the deadband frequency depends on the length of the pipe and also on the velocity of the vibrations. Since the velocity of torsional vibrations is lower than that of axial vibrations, the deadband frequencies for the same drill string will be lower for torsional vibrations than for axial vibrations. Specifically, the first dead band is in the neighborhood of 180 Hz, and at roughly integral multiples thereof.

Similarly as in the case of axial vibrational frequency response, it is believed that the major deadband frequencies for torsional vibrations are substantially independent of the size of the pipe and of the number of sections 6 in drill string 4, so long as the individual lengths of sections 6 are substantially the same. Also similarly to the axial vibration case, local deadbands and passbands are present in the frequency response characteristic for torsional vibrations.

Due to the difference in the major deadband frequencies for axial and torsional vibrations in a drill string 4, the distortion presented to a source signal as it travels along drill string 4 will be different for the axial component than for the torsional component. This is indicated by comparison of axial signal 3c, both of which are distorted from the source signal, and are distorted in different ways relative to one another.

Referring again to FIG. 2, after process 20 in which the vibrations are detected by detectors in sub 12, it is therefore preferable to perform process 30 for the removal of the effects of drill string 4 on the transmitted vibrations. Deconvolution of the impulse response of drill string 4 from the measured axial and torsional vibrations at sub 12 is the preferred method for removing these effects, using separate deconvolution operators for the axial and torsional components. While process 30, particularly deconvolution of the two signal components, 24, is not essential for benefits to be obtained from the method according to the invention, the difference in distortion for the two vibration components clearly indicates that separate deconvolution for the two components will be beneficial in the method according to this embodiment of the invention.

It should be noted that prior deconvolution methods, as noted in the Rector, Marion and Widrow paper cited hereinabove, have taken into account only such distortion as results from the ends of the drill string and the bottomhole assembly. Such coarse deconvolution thus only is dependent upon the total length of the drill string and upon parameters concerning the bottomhole assembly; such important factors as the reflective effects of the tool joints 8 in drill string 4 have not been taken into account by such prior methods. As noted by the above-cited Drumheller article and as evident from the frequency response characteristics of FIGS. 4a and 4b, drill string 4 introduces severe distortion to waves transmitted therethrough, particularly due to the construction of drill string 4 from a number of sections 6 joined by tool joints 8. Further with reference to FIGS. 4a and 4b, this distortion is especially true for vibrations which are at a frequency above 100 Hz, since such vibrations are subject to the major deadbands in the characteristics. Accordingly, this preferred embodiment of the invention includes a method for determining a deconvolution operator which takes into account the reflective and other distorting effects of the construction of drill string 4.

It should be noted that the coarse deconvolution noted above, which takes into account only the length of drill string 4 and the bottomhole assembly, may be used in this embodiment of the invention. It is preferred, however, especially in improving the accuracy of the analysis of the higher frequency components of the axial and torsional vibrations, such higher frequency components containing important information in both the drilling parameter monitoring and seismic prospecting applications, that the deconvolution operator be determined according to the description of the embodiment to follow hereinbelow.

Figure 5:
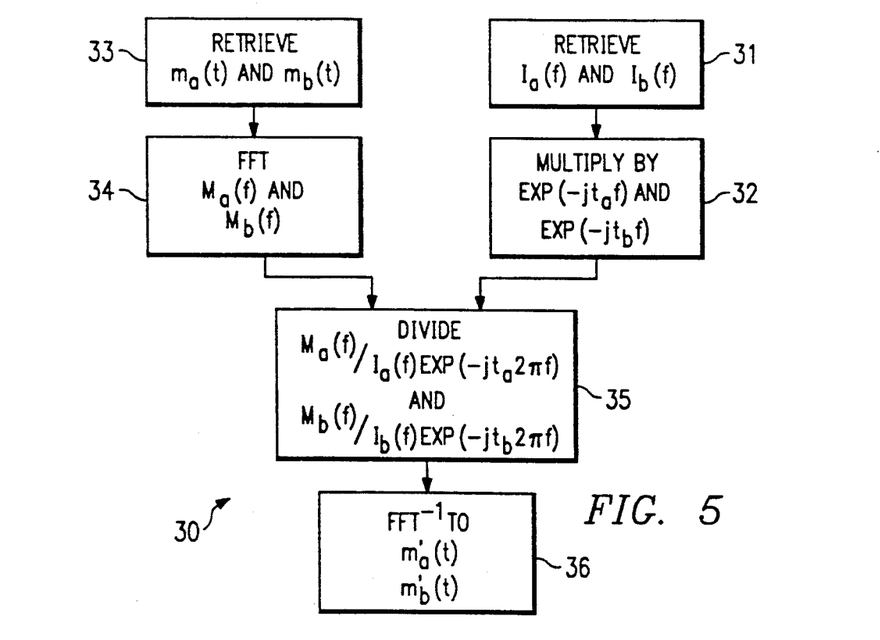
FIG. 5 is a flow diagram of a preferred method of deconvolution according to this embodiment of the invention.

Furthermore, as is evident from the representations of FIGS. 3b and 3c, and as will be made further evident hereinbelow, the value of the time delays $t_a$ for axial vibrations and $t_b$ for torsional vibrations are important in the method according to this embodiment of the invention. Referring to FIG. 5, a preferred method of deconvolution in which the deconvolution operators retain the time delay values will be described. The retained time delay values are beneficial in the subsequent operations of reducing the effects of the random noise.

As noted above, the frequency domain impulse response of drill string 4 may be known from experimentation or modeling; FIGS. 4a and 4b illustrate the magnitude of the frequency response (phase is not illustrated). A preferred method for acquiring the impulse response for drill string 4 is by way of applying vibrational signals at the top of drill string 4, for example with a hammer blow (i.e., substantially an impulse input) or with some other wideband stimulus, to present an axial vibrational input into drill string 4. These vibrations will travel downhole along drill string 4, and reflect from the distal end thereof (e.g., at drill bit 10) back to the surface. Detectors such as in sub 12 described hereinabove detect the transmitted vibrations, with the detected vibrations used to determine the response of drill string 4 to the axial vibrations generated by the axial hammer blow (of course, accounting for travel in both directions). Torsional vibrations may be applied by a hammer blow to a flange located near the top of drill string 4, in a direction which produces torsional vibrations along drill string 4, such vibrations also traveling down drill string 4, reflecting from drill bit 10 and traveling back up drill string and detected by the detectors in sub 12. After analysis, a representation of the response of drill string 4 is stored by conventional computing equipment. Referring to FIG. 5, process 31 indicates the retrieval of the axial vibration frequency response $I_a(f)$ and torsional vibration frequency response $I_b(f)$ from the memory of the computing equipment performing the method according to this embodiment of the invention.

The values of the time delays are preferably combined with the FFTs of the impulse response operators, according to this embodiment of the method. Such retention of the time delay values with the frequency response is preferred, as this representation is stored in the computing equipment performing the analysis, and is used repeatedly over time as the measured vibrations are monitored and analyzed. Time delay in the frequency domain, as is well known in the art, is expressed by multiplication by the phase shift terms. In this embodiment, these phase shift terms may be expressed as $\exp(-jt_a 2\pi f)$ and $\exp(-jt_b 2\pi f)$ for the axial and torsional cases, respectively. In this embodiment of the deconvolution operation, the complex frequency response of drill string 4 is thus expressed as:

$$I_a(f, t_a) = F[i_a(t - t_a)] = [I_a(f)][\exp(-jt_a 2\pi f)]$$

$$I_b(f, t_b) = F[i_b(t - t_b)] = [I_b(f)][\exp(-jt_b 2\pi f)]$$

where $i_a(t - t_a)$ and $i_b(t - t_b)$ are the time-shifted time domain impulse responses for axial and torsional vibrations, respectively, where F is the Fourier operator, and where $I_a(f)$ and $I_b(f)$ are the complex Fourier transforms of the impulse response for axial and torsional vibrations, respectively. FIG. 5 illustrates the performing of this operation in process 32.

It should of course be noted that, if the distance between sub 12 containing the detectors and the source of the signal is constant for multiple deconvolution operations, the result of process 32 may be stored in lieu of the non-shifted frequency response characteristics. It is contemplated, however, that the distance between sub 12 containing the detectors and the point at which the signal is to be analyzed may change over time. For example, the analysis may wish to "zoom" in on another location of drill string 4 for analysis of the signal coming therefrom. Also, the addition of sections 6 to drill string 4 as drilling progresses will also change the distance between drill bit 10 and sub 12, and accordingly the time delay values. For ease in performing such operations with varying delay times $t_a$ and $t_b$, it is preferable to store and retrieve the frequency response characteristic, and to multiply each by the exponential phase shift term during the deconvolution.

For purposes of explanation, the axial and torsional vibrations are expressed as time functions $m_a(t)$ for the measured axial vibrations, and $m_b(t)$ for the measured torsional vibrations, with the functions extending over all non-negative time $t > 0$. As noted above, each of these time series can be considered as the sum of signal and noise components, as follows:

$$m_a(t) = s_a(t) + n_a(t)$$

$$m_b(t) = s_b(t) + n_b(t)$$

where s(t) and n(t) are the time domain representations of the signal and noise components, respectively, of the measured time series signals m(t).

In FIG. 5, retrieval of the time series $m_a(t)$ and $m_b(t)$ from memory of the computer, or directly from the measurement apparatus, is indicated by process step 33. Since convolution in the time domain requires integration, but only requires multiplication (or division, in the case of deconvolution) in the frequency domain, Fourier transformation of the measured time series of signals into the frequency domain is preferred, and is performed in process 34 of FIG. 5.

Since the frequency response operators retain the information relating to the time delay values $t_a$ and $t_b$, the FFTs for the time series of the measured vibrations $m_a(t)$ and $m_b(t)$ may be done over a limited number of points in time. This is useful due to the limited number of points that many FFT algorithms (and hardware) can handle within reasonable computing time, making it useful to limit the range of points in time that are used in the FFT. Accordingly, for the time series $m_a(t)$, the points used in the FFT can begin at or closely before the time $t_a$; similarly, for the time series $m_b(t)$ the points used in the FFT can begin at or closely before the time $t_b$. Since the time delay values are incorporated into the expressions hereinabove for frequency response of drill string 4, they need not be maintained in the FFT of the time series of the measured vibrations. The expressions for the frequency domain representations of the measured vibrations are as follows:

$$M_a(f) = F[m_a(t)]$$

and $$M_b(f) = F[m_b(t)]$$

where $M_a(f)$ is the frequency domain representation of the measured axial vibrations, where $M_b(f)$ is the frequency domain representation of the measured torsional vibrations, and where F is the Fourier transform operator.

Deconvolution is then accomplished, in process 35 of FIG. 5, by the division of the frequency domain representations $M_a(f)$ and $M_b(f)$ by the frequency response operators $I_a(f,t_a)$ and $I_b(f,t_b)$, respectively. This division can be done according to well known techniques in the computing art, for example by point-by-point division of the two representations at a series of discrete frequencies in the range of interest. In order to avoid divide-by-zero problems, it is preferred to add "white noise", i.e., small magnitude signals at all frequencies, to the representations of the frequency response operators I(f,t). The results of these division operations are then converted into time domain representations by performing the inverse FFTs, in process 36 of FIG. 5, resulting in time domain representations $m'_a(t)$ and $m'_b(t)$. The sum of these representations of signal and noise components can be expressed as follows:

$$m'_a(t) = s'_a(t) + F^{-1}[N_a(f)/I_a(f)\exp(-jt_a 2\pi f)]$$

$$m'_b(t) = s'_b(t) + F^{-1}[N_b(f)/I_b(f)\exp(-jt_b 2\pi f)]$$

where $F^{-1}$ is the inverse Fourier operator, and where N(f) is the frequency domain representation of noise components 26.

Figure 6:
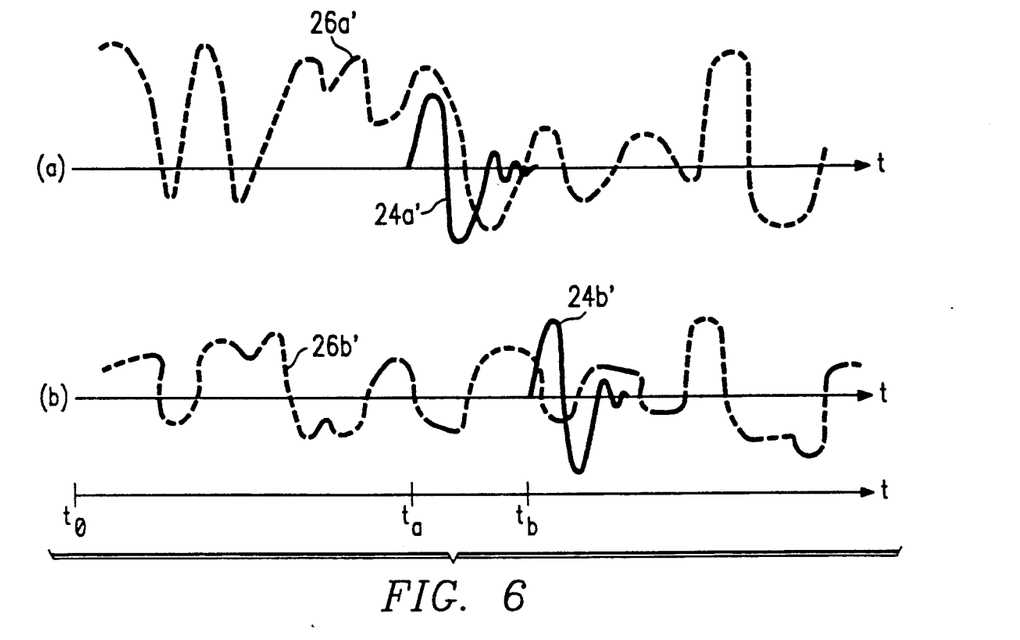
FIGS. 6a and 6b are time domain representations of axial and torsional vibrations, respectively, measured at the top of the drill string of FIG. 1, after deconvolution.

Referring to FIGS. 6a and 6b, representations $m'_a(t)$ and $m'_b(t)$ after deconvolution are illustrated for the axial and torsional measured vibrations, respectively, with noise components 26' and signal components 24' shown separately as above. As a result of the deconvolution of process 30, the signal components 24a' and 24b' more closely resemble one another, and more closely resemble the source signal 22 of FIG. 3a. This is due to the removal of the effects of drill string 4 on the vibrations transmitted through drill string 4 from the point of interest (e.g., drill bit 10) to the detectors in sub 12. The time delay values $t_a$ and $t_b$ have been retained after the deconvolution, as discussed hereinabove, as shown in FIGS. 6a and 6b.

It should be noted that the deconvolution step described above will operate on both the noise and signal components of the measured time series of vibrations. However, since for purposes of this invention the noise is considered as random noise, the deconvolution of random noise results in random noise, and will be equally reducible according to the method described herein.

Referring again to FIG. 2, upon the completion of the deconvolution of process 30, the next step in this embodiment of the invention is a time shift of the deconvolved axial and torsional time domain representations $m'_a(t)$ and $m'_b(t)$ relative to one another. This is performed in process 40 of FIG. 2.

Referring again to FIGS. 6a and 6b, it should be noted that the signal components 24a' and 24b' more closely resemble one another, with the torsional component 24b' delayed in time from the axial component 24a' by the time $t_b - t_a$; no such resemblance is present for the noise components 26' since, as discussed above, the noise signals are generated at various points along drill string 4, so that the time delay between the arrival of the axial noise component 26a' and the torsional noise component 26b' will not be a constant for all such noise, but will depend upon the individual noise source, many of which are summed together when considering the signal components 24' of interest.

This embodiment of the invention takes advantage of the correlation between the signal components 24' and the lack of correlation between the noise components 26' to reduce the effects of the noise on the signal. This is done in process 40 according to the invention, where the two representations $m'_a(t)$ and $m'_b(t)$ are made coincident in time and then summed.

Figure 7:
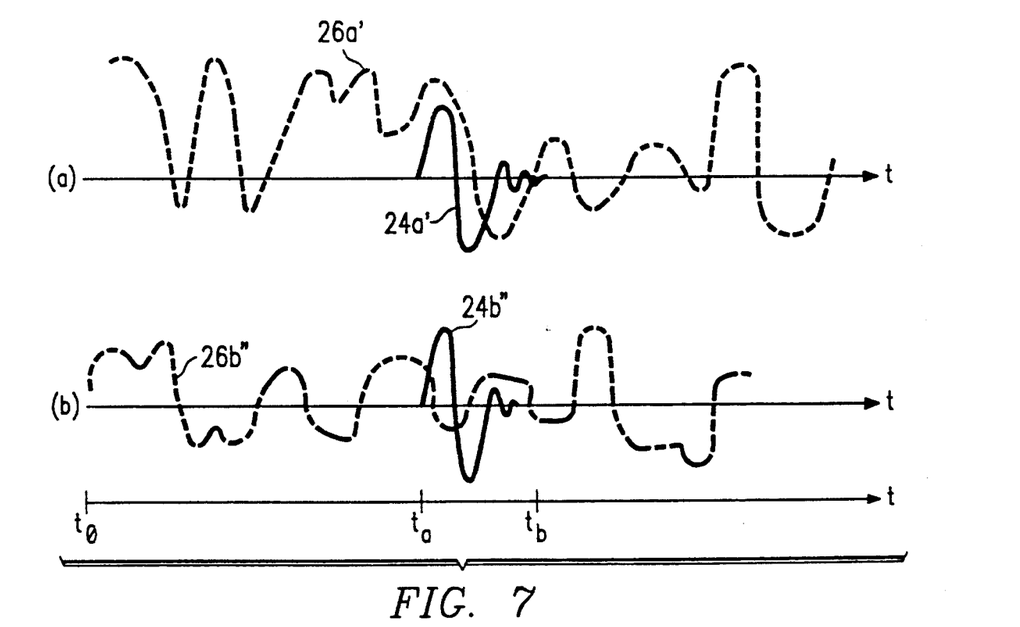
FIGS. 7a and 7b illustrate the time shifting of the axial vibration representation and torsional vibration representation of FIGS. 6a and 6b relative to one another.

In practice, of course, the representations $m'_a(t)$ and $m'_b(t)$ are time series of measured vibrations, upon which the operations of process 30 have been performed, and the signal and noise components 24' and 26' are not known. However, the distance from drill bit 10 (or such other source of interest) is known, as are the relative velocities of the torsional and axial vibrations in drill string 4. Accordingly, the time shift of process 40 can be easily done by multiplying the distance between drill bit 10 and sub 12, in this example, by the difference in the axial and torsional velocities to determine the value $t_b - t_a$. Once $t_b - t_a$ has been determined, either the axial or torsional time series can be shifted by this value in the computer performing the analysis. In this example, the representation of the torsional vibrations will be shifted to be considered earlier in time; the shifted representation will be referred to as $m'_b(t-(t_b-t_a))$. Referring to FIGS. 7a and 7b, the time shifting of the torsional representation $m'_b(t-(t_b-t_a))$ is illustrated, with time shifted signal component 24b" and time shifted noise component 26b". It should be noted, of course, that the axial representation may alternatively be shifted later in time to coincide with the torsional representation, if desired; further alternatively, both representations may be shifted in time to coincide at a third point in time.

By virtue of the assumption that the axial and torsional signal components 24 are similar, or substantially proporational to one another, the two time-shifted (and deconvolved, if desired) representations may be summed together to reinforce the signal portions. It is believed that this assumption is valid in at least the cases of vibrations generated by drill bit 10, vibrations generated by casing slap, and vibrations generated by axial and torsional transducers located in a bottomhole assembly 11 for the application of stress wave telemetry. Therefore, upon completion of the time shift of process 40, the two representations $m'_a(t)$ and $m'_b(t-(t_b-t_a))$ are summed together in process 50. Since the signal components 24a' and 24b" resemble one another, and since the noise components 26a' and 26b" do not (both being random, including after the time shift of the torsional representation), such a summation will tend to reinforce the signal components 24 while the noise components 26 will randomly add to or subtract from one another. Accordingly, the signal-to-noise ratio will be improved, with the signal components 24 reinforcing one another relative to the noise components 26 which will remain approximately the same, on the average over the time period of interest. The summing operation, in the case where the torsional representation is time-shifted, can be expressed as follows:

$$m'_a(t)+m'_b(t-(t_b-t_a))=s'_a(t)+F^{-1}[N_a(f)/I_a(f)\exp(-jt_a2\pi f)]+s'_b(t-(t_b-t_a))+F^{-1}[N_b(f)/I_b(-f)\exp(-j(t_b-t_a)2\pi f)]$$

However, as recognized above, the time-shifted torsional signal can be considered as proportional to the axial signal, i.e., $$s'_b(t-(t_b-t_a))=Ks'_a(t)$$

Accordingly, the sum of the axial and time-shifted components can be expressed as follows:

$$m'_a(t)+m'_b(t-(t_b-t_a))=(K+1)s'_a(t)+n'(t)$$

where n'(t) is a noise component consisting of the sum of the deconvolved axial and time-shifted torsional noise components. As noted hereinabove, since the noise components can accurately be considered as random for purposes of this method, the factors making up n'(t) need not be retained.

It should be noted that the time shifting operation of process 40 may be done in conjunction with the summation of process 50, rather than as a separate step prior to the summation, if the computing process is more easily done in this way. For example, if the number of samples in the time series of measured vibrations are the same for the axial and torsional vibrations, an ordered summation may be done merely by adding the amplitude of the first axial sample (at about time $t_a$) with the first torsional sample (at about time $t_b$), continuing over the range of time of interest. Such a method would necessarily incorporate the time shift, since the vibrations would coincide in time due to the summation operation performed, and without an additional step of time-shifting performed for one of the time series of measured vibrations.

It should also be noted that the signal-to-noise ratio is now improved by the method according to this embodiment of the invention. Considering the signal-to-noise ratio of each of the axial and torsional components, as measured, as follows:

$$S/N_a=s_a(t)/n_a(t)$$

$$S/N_b=s_b(t)/n_b(t)$$

the signal-to-noise ratio after the method of this embodiment of the invention thus can be on the order of $K+1$ times that each of the original ratios, if the assumption that there is, on the average, no additive reinforcement of the noise components in the summation so that the amplitude of the noise components remains relatively constant. For the case where the amplitudes of the noise components in the axial and torsional vibrations are approximately equal, it is believed that the improvement in the signal-to-noise ratio is on the order of the square root of two.

It should further be noted, however, that the amplitude of the axial noise component $n_a(t)$ is generally significantly larger than the amplitude of the torsional noise component $n_b(t)$, as in most drilling applications more axial noise than torsional noise is generated. Accordingly, the increase in the signal-to-noise ratio can be maximized if the amplitude of the noise components are approximately the same prior to the summation operation in process 50. This can be accomplished be performing a weighted summation where one of the components, generally the torsional component, has its amplitude multiplied by a constant which is the ratio of the amplitude of the axial noise to the ratio of the torsional noise. Accordingly, the summing operation would be as follows:

$$m'_a(t)+m'_b(t-(t_b-t_a))=[s'_a(t)+n'_a(t)]+(i\,N_a/N_b)[s'_b(t-(t_b-t_a))+n'_b(t-(t_b-t_a))]$$

where n'(t) represents the deconvolved noise components, as described hereinabove, and where $N_a$ and $N_b$ represent the root-mean-square amplitude of the axial and torsional noise components, respectively, over the time period of interest. This weighted summation is preferable in the case where the relative amplitudes of the noise components differ between the axial and torsional vibrations, as it provides the ability of the two noise components to cancel out one another to a greater extent than in the case where one is much larger than the other. Such cancellation is, of course, helpful in improving the signal-to-noise ratio.

The result of the weighted (or unweighted, as the case may be) summation is a signal in which the signal component can be more easily identified and analyzed for the particular operation. Referring to FIG. 2, the case of seismic prospecting using drill bit 10 as the source is completed by process 60, in which the source signal is correlated with the reflected signals detected by geophone 18 of the system of FIG. 1. Methods of performing such correlation are conventional in the art, and include, for example, the Vibroseis ® technique.

For purposes of performing such correlation, the time delay resulting from transmission of the vibrations along drill string 4 must, of course, be taken into account. A method for performing such correlation, in the particular case where the drill bit energy serves as the seismic source waves, is described in the Rector, Marion and Widrow article "Use of Drill-Bit Energy as a Downhole Seismic Source" cited hereinabove.

In the application described in U.S. Pat. No. 4,715,451 cited hereinabove, where the vibrations are indicative of certain drilling parameters, as a result of the method described hereinabove the vibrations at the location of drill bit 10 can be more easily identified and analyzed, than in the case where the signal-to-noise ratio remains low. In addition, by changing the distance of interest, i.e., changing the value of time used in the relative time shift between the axial and torsional vibrations after deconvolution, different locations of drill string 4 can be separately analyzed. This allows analysis of the vibrations originating at any point along drill string 4, and allows for the detection of the location of casing slap or other vibration generating events, without requiring additional steps of detecting the vibrations; the originally detected time series data can be used, and reanalyzed, with the change in the relative time delay.

Figure 9:
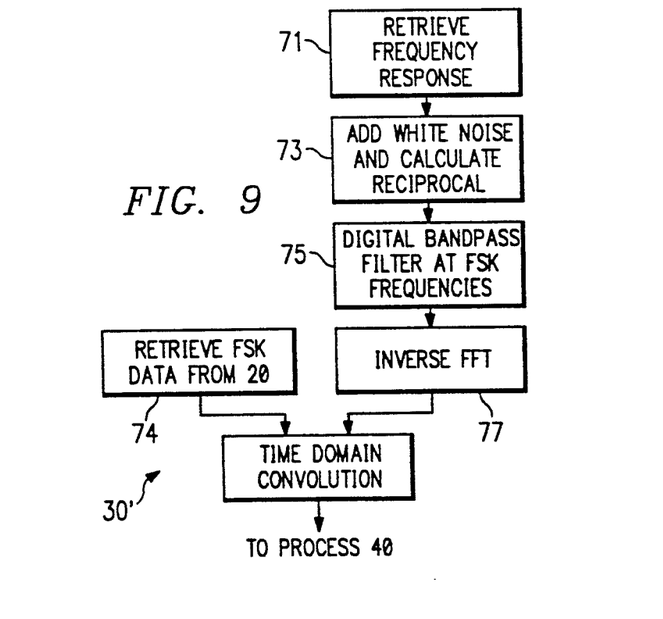
FIG. 9 is a flow diagram of a deconvolution method according to another embodiment of the invention.

The noise reduction technique of this invention can also be used in the application of stress wave telemetry, such as described in said copending applications Ser. No. 188,231 filed Apr. 21, 1988, now U.S. Pat. No. 4,992,997, issued Feb. 12, 1991, Ser. No. 554,030 filed Jul. 16, 1990, and Ser. No. 554,022 filed Jul. 16, 1990, incorporated herein by this reference. In stress wave telemetry, however, a different method of deconvolution may alternatively be used, taking advantage of prior knowledge of the frequencies at which the information is being transmitted. FIG. 9 illustrates a flow diagram for the deconvolution of stress wave telemetry information, in the example where the information is frequency shift keyed, such deconvolution being performed as process 30 of FIG. 2 discussed hereinabove.

Referring now to FIG. 9, process 30' for the deconvolution of stress wave telemetry data will now be described. Conventional computing equipment, such as described relative to FIG. 8 hereinabove, can be programmed to perform the calculations and operations in the flow of FIG. 9. It should be noted that process 30' of FIG. 9 is to be performed separately on axial and torsional vibration data, according to the axial and torsional frequency response of drill string 4 illustrated in FIGS. 4a and 4b described hereinabove, similarly as the separate deconvolution for axial and torsional vibrations in process 30 described hereinabove relative to FIG. 5.

Similarly as in process 30 of FIG. 5, the frequency response of the drill string I(f) is retrieved from memory, in process 71. Since deconvolution in the time domain corresponds to division in the frequency domain, and since process 30' performs the deconvolution by way of a convolution operation (as will be described hereinbelow), the reciprocal of the frequency response I(f) is calculated in process 73. It is preferable to eliminate the potential for divide-by-zero problems by adding a small level of "white noise" to the frequency response characteristic I(f) prior to its division into unity. Accordingly, the reciprocal frequency response characteristic A(f) may be calculated in process 73 as:

$$A(f) = 1/[I(f) + e]$$

where e is a small constant relative to the amplitude of I(f), and is independent of frequency. Such division may be done in conventional computing equipment in the conventional manner, for example by iterative addition and division at a series of desired frequency values.

Since the frequencies of transmission are known in the stress wave telemetry application, the frequency response of drill string 4 outside of the transmission frequencies is neither useful nor relevant in the deconvolution process 30'. Accordingly, in process 75, the reciprocal frequency response A(f) calculated in process 71 is bandpass filtered about the frequencies of transmission. For example, if frequency shift keyed (FSK) digital data is being transmitted by vibrations at 920 Hz (for a "0") and at 1180 Hz (for a "1"), the reciprocal frequency response A(f) can be filtered so that frequencies near the transmission frequencies (e.g., plus or minus 50 Hz from each of the transmission frequencies) will be passed with unity gain, with frequencies outside of the bands fully attenuated by the filter. The result of process 75 is thus a filtered reciprocal frequency response B(f):

$$B(f) = \text{bandpass}[A(f), 870\text{--}970 \text{ Hz}, 1130\text{--}1230 \text{ Hz}]$$

where the bandpass function, performed by computing system 19, is a conventional digital bandpass filter as can be performed by conventional computing equipment. It should be noted that the DSP boards discussed hereinabove are also especially adapted for the performing of digital filter operations, as is well known in the art.

Process 77 calculates the inverse Fourier transform of the bandpassed reciprocal frequency response B(f) in the conventional manner. The result is a time domain operator b(t), which represents the reciprocal of the impulse response of drill string 4, at frequencies near the transmission frequencies of the FSK data. It may be useful to further filter the time domain operator b(t) in such a manner that only the portions thereof which are above a certain amplitude are used in the convolution operation, with the lower amplitude portions set to zero; such filtering will reduce the number of calculations in the convolution operation with minimal effect on the result.

In process 74, the time series data m(t) upon which the deconvolution operation is to be performed is retrieved from process 20 of FIG. 2. Such time series data can, of course, be received directly from sub 12, may be alternatively retrieved from the memory of computing system 19 if previously received data is to be analyzed, or may be received from such other appropriate source. Process 78 performs a time domain convolution of the time series data m(t) with the reciprocal filtered impulse response operator b(t). Since the operator b(t) is derived from the reciprocal of the frequency response, the time domain convolution of process 78 corresponds to deconvolution with the impulse response of drill string 4. The result of process 74 is thus a time series m'(t) which, as in the case of process 30 described hereinabove, is the measured vibration data with the distortions from the non-ideal transmission of drill string 4 removed therefrom.

It should be noted that, for repeated transmissions at constant frequencies from the same location in drill string 4, the result b(t) from processes 71, 73, 75, and 77 may be stored in the memory of computing system 19 for convolution with multiple time series m(t) over the length of the transmission. This is possible due to the dependence of operator b(t) solely on the construction of drill string 4 between the transmitting and receiving locations, and on the frequency of transmission. Accordingly, the deconvolution of process 30' can be most efficiently performed by computing system 19 by avoiding recalculation of the repetitive steps.

After deconvolution of both of the axial and torsional vibration time series $m_a(t)$ and $m_b(t)$ according to process 30', in the stress wave telemetry application, the process of FIG. 2 can be continued, with the time shifting step of process 40.

As a result of the method according to the above-described embodiments of the invention, the improved signal-to-noise ratio provides enhanced ability to analyze and use data transmitted by vibrations along a structure such as a drill string. Such improvement in the definition of the signal components of the vibrations allows for better quantification of drilling parameters, in the application where inherent vibrations are analyzed to determine such parameters as in the example of the above-referenced U.S. Pat. No. 4,715,451. The method also provides improved receipt of vibration signals which are sent in stress wave telemetry. Such improved receipt allows not only more accurate communication by way of stress wave telemetry, but also enables the data transmission to take place at higher frequencies, since additional attenuation can be tolerated with an improved signal-to-noise ratio.

Furthermore, the improved signal-to-noise ratio, and also the improved deconvolution technique, allows for more accurate determination of the seismic source signature in the application of seismic prospecting using the drill bit as the seismic source. Since the accuracy of the correlation results depend upon the accuracy of the seismic source signature, the accuracy of the seismic analysis will be improved by use of the method according to the preferred embodiment of the invention. Furthermore, as noted above in the Background of the Invention, currently available systems for detecting the seismic source signature from drill string vibrations have been observed to be ineffective for particular drilling operations, such as those using PDC bits and downhole motors, since the noise amplitude is apparently larger for these operations. It should be noted that the choice of drill bit, and the choice of downhole motor versus top drive, depends in large part upon the type of formations into which the drilling is occurring. Accordingly, the method according to this embodiment of the invention can enable seismic prospecting in such formations which require the use of such drilling equipment, as the method provides for reduction of the effects of noise in the vibrations transmitted along the drill string.

It should be noted that the methods according to the above-described embodiments of the invention are applicable not only to axial and torsional vibrations transmitted along a drill string or other structure, but may also be applied to other acoustic signals transmitted or traveling along a structure, where such signals are generated at a particular location and have components of differing velocities which are substantially proportional to one another.

While the invention has been described herein relative to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as claimed hereinbelow.

I claim:

1. A method for improving the signal quality of vibrations comprising axial and torsional components, transmitted over a known distance along a structure between a first location at which the vibrations are generated and a second location, comprising the steps of:
   detecting axial and torsional components of the vibrations at said second location, and storing first and second time series representations corresponding to said axial and torsional components, respectively;
   calculating a delay time corresponding to the known distance between said first location and said second location multiplied by the difference between the velocities of axial and torsional vibrations in the structure;
   calculating a constant corresponding to the ratio of the amplitude of axial noise vibrations in the structure to the amplitude of torsional noise vibrations in the structure;
   multiplying said second time series representations by said constant; and
   time shifting one of said first and second time series representations relative to the other of said first and second time series representations by an amount corresponding to said delay time; and
   after said multiplying and time shifting steps, adding said first and second time series representations to one another so that the axial and torsional components of the generated vibrations reinforce one another.

2. The method of claim 1, wherein said time shifting step comprises:
   shifting said first time series by the amount of said delay time, prior to said adding step.

3. The method of claim 1, wherein said time shifting step comprises:
   shifting both said first time series and said second time series in such a manner that the total shift equals said time delay.

4. The method of claim 1, further comprising:
   combining said first time series with a function corresponding to the response of said structure to vibrations having said first known velocity; and
   combining said second time series with a function corresponding to the response of said structure to vibrations having said second known velocity;
   wherein said adding step adds the results of said combining steps.

5. The method of claim 1, further comprising:
   correlating the result of said adding step with vibrations detected at the surface of the earth remote from said second location, said vibrations corresponding to vibrations generated by a drill bit at said first location and transmitted through the earth.

6. The method of claim 1, wherein said time shifting step comprises:
   operating a computing system to calculate said time delay by multiplying the known distance between said first and second locations by the difference between the velocities of axial and torsional vibrations in said structure.

7. The method of claim 1, further comprising:
   calculating a plurality of time delay values corresponding to a plurality of known distances along said structure from said second location; and
   wherein said adding step is performed for each of said plurality of time delay values, wherein said one of said first or second time series representations is shifted according to each of said plurality of time delay values, in order to determine the location along said structure from which certain vibrations are generated.

* * * * *